United States Patent [19]

Carlsson

[11] Patent Number: 5,048,646

[45] Date of Patent: Sep. 17, 1991

[54] ANTI-SKID DEVICE

[75] Inventor: Lennart Carlsson, Skänninge, Sweden

[73] Assignee: Onspot AB, Linkoping, Sweden

[21] Appl. No.: 424,744

[22] Filed: Oct. 20, 1989

[30] Foreign Application Priority Data

Oct. 20, 1988 [SE] Sweden .................... 8803755

[51] Int. Cl.⁵ .............................. B60T 1/04
[52] U.S. Cl. ................. 188/4 B; 152/208;
301/42; 384/245; 384/272; 384/425; 384/498;
384/585; 403/90; 403/131; 403/148
[58] Field of Search ............. 188/4 B; 301/42;
403/90, 131, 137, 148; 384/245, 420, 425, 243,
538, 585, 272, 498; 152/208

[56] References Cited

U.S. PATENT DOCUMENTS

| 452,195 | 5/1891 | Rhoades | 384/420 X |
|---|---|---|---|
| 857,537 | 6/1907 | Reser | 384/425 X |
| 1,195,974 | 8/1916 | Campbell | 188/4 B |
| 1,499,298 | 6/1924 | Eller | 403/137 |
| 1,973,847 | 9/1934 | Orlow et al. | 403/90 X |
| 2,140,606 | 12/1938 | Stickles . | |
| 2,277,036 | 3/1942 | Chaussee . | |
| 2,442,322 | 5/1948 | Daley . | |
| 2,767,809 | 10/1956 | Sutter | 188/4 B |
| 3,068,949 | 12/1962 | Sirois | 188/4 B X |
| 4,520,983 | 6/1985 | Templeman | 403/90 X |
| 4,745,993 | 5/1988 | Schulz et al. | 301/42 X |

FOREIGN PATENT DOCUMENTS

| 0151098 | 8/1985 | European Pat. Off. . | |
| 3509062 | 3/1985 | Fed. Rep. of Germany . | |
| 784469 | 7/1975 | France | 188/4 B |

Primary Examiner—George E. A. Halvosa
Attorney, Agent, or Firm—Cushman, Darby & Cushman

[57] ABSTRACT

An anti-skid device of the type including an arm, carrying in its outer end a chain-provided pulley that is brought in contact with a vehicle wheel so that the chains are thrown in under the vehicle wheel. The arm is, in its inner end, journaled in a U-shaped or fork-shaped bracket via a short axle that, in its ends, rests in bowl-shaped hemispherical bearings that are threaded into the legs of the bracket. The bearing bowls are pretensioned against the axle. At the apex of the shaft's spherical ends, recesses are made that take-up lubrication grease and, in this way, a point-like contact between the bearing shells and the axle is eliminated.

7 Claims, 2 Drawing Sheets

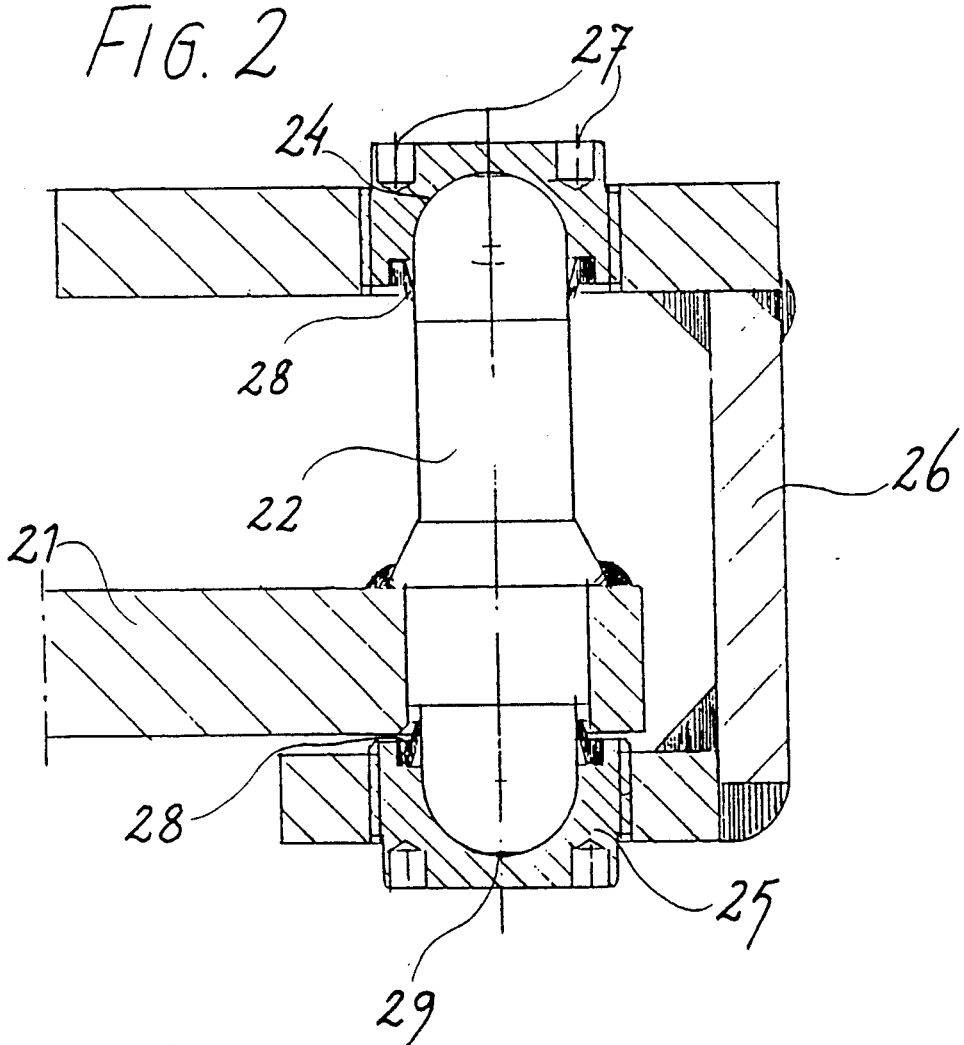
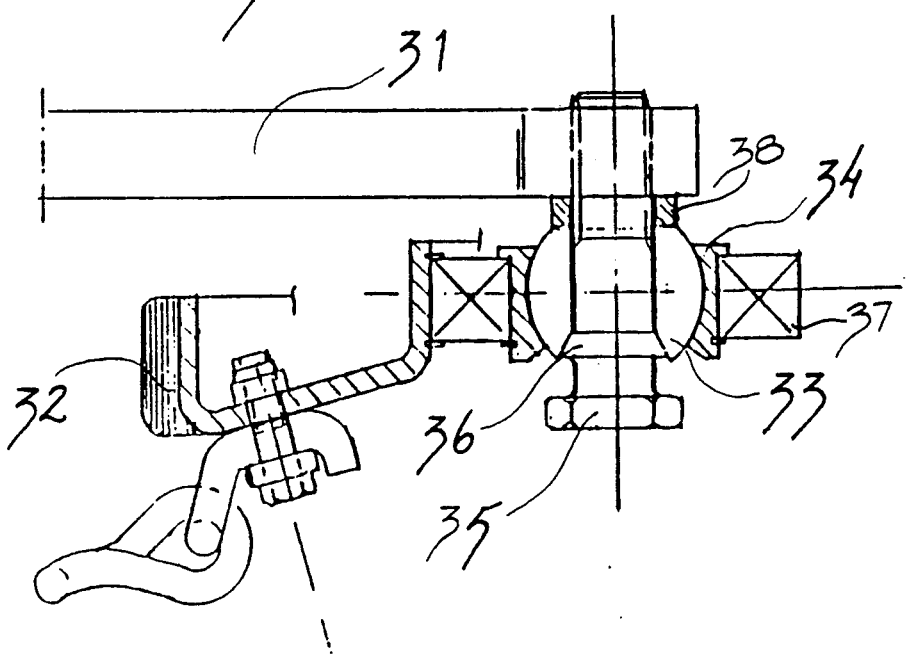

ANTI-SKID DEVICE

BACKGROUND OF THE INVENTION

This invention concerns so called automatic antiskid devices of the kind that, for instance, is described in U.S. Pat. No. 4,299,310. Anti-skid devices of this kind include a pulley on which has been arranged a number of chains. In use, the pulley is brought in contact with the side of a vehicle wheel, causing the pulley to rotate with the wheel, and the chain pieces are thrown in under the wheel, thereby improving the traction of the vehicle wheel. The chain-provided pulley is journaled in the outer end of an arm actuated by, for instance, a pressurized air-cylinder so that the pulley can be moved from its working position in contact with the side of the vehicle wheel and a parking postion out of the way. This construction has turned out very well in practice even if other and new constructions have been added to the market.

In order to secure that the chain-provided pulley always is brought in contact with the vehicle wheel at the correct position, the amount of play that is acceptable in the journaling of the arm at its inner pivot point is limited. Furthermore, the arm must be very easily pivotable in order not to increase size and cost of the pressurized aircylinder. On the other hand, the journaling of the pivotpoint may not became too expensive. Due to the limited amount of space in many vehicles today, the journaling of the the arm cannot be bulky.

In order to handle the very great loads that the arm is subjected to, the arm has been journaled in ball bearings. This works very well to start with. However, the ball bearings wear out prematurely. The exchange frequency has turned out to be substantially independent of the quality of the bearings. An increased play in the bearings results in a poorer function and possible damage to other parts of the antiskid device. The journaling of the arm has thus turned out to be a weak point, and a better bearing is needed.

SUMMARY OF THE INVENTION

The above problem is, in accordance with the principles of the present invention, solved by journaling the arm by a stub shaft that, in its outer ends, is journaled in bearings that, in a bowl-like way, enclose the shaft axially as well as radially. Preferably, the bearings are spherical bowl, shaped shells with correspondingly spherically shaped stub shaft ends. Seals can be applied to prevent dirt from entering into the bearings, and the bearing shells are in preferably arranged in a fork, like construction gripping over the end of the arm. In this way, in particular if the bearing shells are threaded in the supporting structure can, a certain axial pre-tension be given for the bearing which, in turn, contributes to a play-free bearing with a great life span.

Since the angle of the chain provided pulley in its working position is very important in order to secure an absolutely correct "throw in" or path for the chains, so that these optimally are placed below the vehicle wheel. To solve this problem, it is necessary, or at least practical, to have an adjustment for the pulley in the outer end of the arm. Such adjustment devices are shown in European patent publication number 151,098 and German patent 35 09 062. However, it is a problem that this adjustment must be so stiff or tough that it will be able to sustain the really great loads on the chains and the chain-provided pulley as the chains pass under the vehicle wheel. No adjustment devices have yet been developed that can sustain these very great loads without beeing bulky, thus increasing the weight of the device and the load on the arm and its bearing. Therefore another object of the invention is to solve this problem. This is done by providing an adjustable ball device at the very center of the chain-provided pulley, or centrally in the virtual plane of the forces imparted to the chains and the pulley. This will also reduce the stress on the pulley itself.

BRIEF DESCRIPTION OF THE DRAWINGS

An embodiment according to the present invention is below described in greater detail with reference to the accompaning drawings, in which:

FIG. 2 shown in a larger scale, the inner end of the swing arm according to the invention; and FIG. 3 depicts the outer end of the same swing arm.

DETAILED DESCRIPTION

Figure 1:
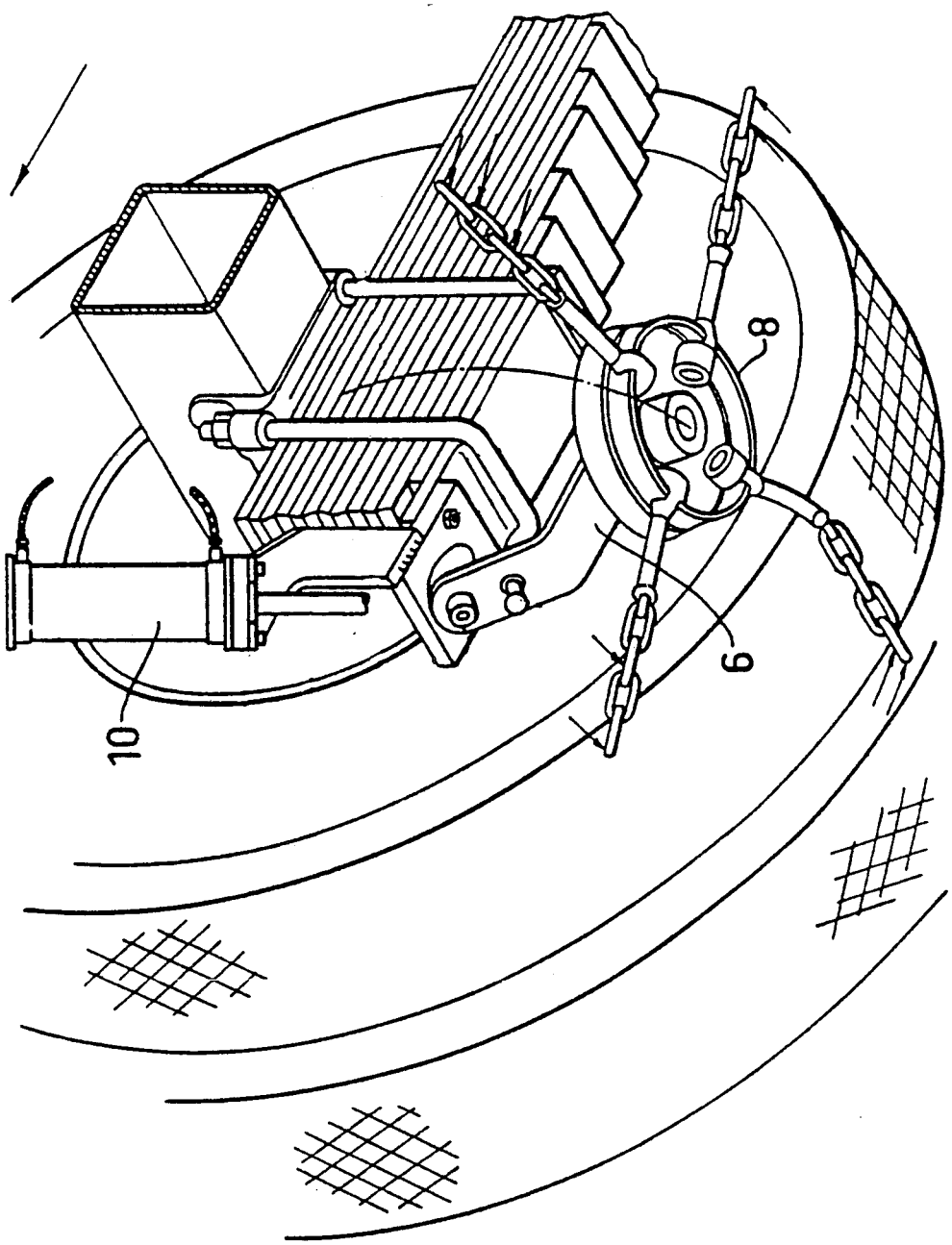
FIG. 1 is a perspective view from below of a partially cut away truck axle, with two tires and a device according to the known technique mounted below the spring assembly for the drive axle.

In FIG. 1 a device of the type Onspot 01 as disclosed in (U.S. Pat. No. 4,299,310) is shown. A chain-provided pulley 8 is rotatably mounted on an arm 6, which, in turn, is pivotably journaled on a bracket situated on the bottom of the spring assembly of a vehicle. The arm and pulley are shown in an active position, with the pulley in contact with the wheel. The arm is actuated by means of a remotely controlled air cylinder 10. The arm is the weak point of this device, as of many others, and therefor the improvements shown in FIGS. 2 and 3 are a great step forward.

In FIG. 1 is shown how, in accordance with the principles of the present invention, the inner end of the swing arm is journaled. The swing arm 21 is arranged on a stub shaft 22. This can be done in different manners, but in the shown case the stub shaft 21 is made of stainless steel and the arm is made of common steel. The stub shaft is preferably press fitted into the end of the arm, and, in order further to improve the grip, these two elements are welded to each other. Of course, other fastening methods are possible. The stub shaft 22 is, in its end, provided with substantially spherical surfaces 24 fitting in opposed bowl-shaped bearing shells 25. These bearing shells are circumferentially provided with a thread and they are threaded into two legs of a U-shaped arm bracket 26.

Each bearing shell is provided with key grips 27, and, on the inner side or the side that is turned against the stub shaft 22, the bearing shells are provided with seals or scrapers 28 in order to prevent dirt from entering the bearing surfaces and also to retain the bearing grease in the the bearing. At the very center of ends of the stub shaft, the spherical surfaces are slightly machined or recessed 29 in order to provide a small space for bearing grease and also to secure that contact will not take place at a point, but along a spherical segment which, in turn, will increase the life span of the bearing.

The arm bracket 26 is preferably dimensioned in such way that its resilience or elasticity does not push away the grease in the bearings, but allows a certain wear before any play will occur.

In the shown embodiment, the bracket is expanded about a half millimeter and, consequently, a wear of the same size can be taken before any play appears. Since the bearing surfaces are spherical, a possible misalignment between the two bearings 25 is without importance. This possible misalignment can be the result of the pretensioning on mounting, machining tolerances, or even the forces on the arm. In other words, without any tendency towards binding, the journaling of the arm is in itself resilient, which reduces the stress on practically all parts of the device.

When the bearing shells have been tightened with the desired torque in order to achieve this relationship, they are secured by means of a suitable thread-locking glue, or by means of a punch mark.

The probable reason why ball bearings are so unsatisfactory is presumably not the large forces on use of the device, but instead the comparatively moderate forces that are excerted on the arm bearing when the device is at rest. These forces are well below the forces that a ball bearing should be able to take without being damaged even if the load is for a long time. The circumstances are, however, made more difficult by the fact that the arm only executes a forth and back movement that, in each actuation cycle, goes from exactly the same starting position to a working position and back to the same starting position. This means that when the device is well-mounted on the car the balls of the ball bearing will, in the resting or parking position of the swing arm, always be in exactly the same position, and, with the vibration load that it is then subjected to, the grease is in the end pushed aside and wear starts. This would explain why ball or roller bearings are improper for arm bearings. It must, however, be pointed out that this is not self-evident in any way and that it has taken considerable time and research to understand all these circumstances.

In FIG. 3, is shown the outer end of the swing arm 31. In this end, the chain provided pulley 32 is mounted. The pulley is journaled on a bearing 37 which in turn, is mounted on a hub portion 34. The hub portion 34 is, on its outside, provided with a cylindrical surface with a flange in one end and a groove in the other end, in order to, between the flange and a lock ring, grip the inner race of the bearing 37. On its inside, the hub part 34 is provided with a spherical surface, the center which is located substantially in the middle of the length of the hub part 34. Inside the hub part 34 a ball 33 is arranged. The ball 33 has a spherical outer surface corresponding to that of the inner surface of the hub part 34. Furthermore, the ball 33 is provided with a central hole through which a bolt 35 extends. The bolt 35 is threaded into the outer end of the swing arm and between the ball 33, and, the swing arm, is arranged a distance piece or washer 38. The hole in the ball 33 on the side turned away from the swing arm is provided with a conical chamfering, with a conical washer 36 on the bolt.

When the device is mounted, the swing arm is brought to the position in which the chain provided pulley is in contact with the vehicle wheel, and the angles lengthwise and transversally relative the vehicle wheel are adjusted to provide a correct path for the chains when these are thrown in under the vehicle wheel. The bolt 35 is then tightened and the conical washer 36 will expand the ball 33 so that the position between the hub part 34 and the ball 33 is locked. Since the bolt can exert very great forces on the ball, a very secure grip is obtained. The ball 33 is axially slotted over a major part of its length into four segments, faciliating mounting as well as the expansion thereof.

Preferably, stainless steel is used as material for the ball since this will prevent corrosion and allow for future adjustment if this becomes neccesary due to wear changing tires, or damage to the arm or supporting structure. This possibility has not existed with the known devices, because it has been necessary to secure the joints by welding or similiar not readily reversible methods in order to prevent loosening. Within the scope of the invention, the inner race of the ball bearing and the hub part 34 can be integrated.

Since the ball joint is placed in the force center of the chain-provided pulley, the forces exerted on the ball joint will be unable to alter its position, despite the very compact dimensions. By means of the ball joint, it will also be possible to adapt the device for left hand and right hand devices, reducing the number of parts.

Finally, it should be noted that the measurements according to the invention at the inner end and the outer end of the arm respectively can be used or carried-out independently of each other.

It should also be noted that the invention is not restricted to the shown embodiments but that these are only given by way of example.

What I claim is:

1. An anti-skid device for a vehicle wheel, comprising:
   a pulley having a plurality of wheel tractionincreasing chains secured thereto; and
   means for mounting the pulley on a vehicle for movement between a working position wherein the pulley is engaged with a ground-engaging vehicle wheel to be rotated thereby for successively throwing said chains between a tread of a vehicle wheel and the ground, for increasing traction of that vehicle wheel on the ground, and a stowed position in which the pulley is spaced away from driven engagement with the vehicle wheel and the chains are spaced away from under the tread of the vehicle wheel;
   said pulley mounting means comprising:
      a swing arm having an outer end and an inner end;
      means for mounting said inner end of said swing arm to a frame portion of a vehicle for pivotal movement of said swing arm to thereby move said pulley between said working position and said stowed position;
      means mounting said pulley on said outer end of said swing arm;
      said means mounting said pulley on said outer end of said swing arm including: means providing a ball joint ball on said outer end of said swing arm; said pulley including a radially outer portion having said chains secured thereto, and a radially inner hub; means defining a radially inwardly concave ball joint socket in said hub, said socket swivelably receiving said ball; and means defining a rotary bearing on said pulley between said radially outer portion and said hub for permitting rotation of said radially outer portion relative to said hub about a longitudinal axis of said hub.

2. The anti-skid device of claim 1, wherein said means for mounting said inner end includes:
   a stub shaft secured transversally on said inner end so as to have two generally hemispherically curved opposite ends which are convex away from one another in axially opposite directions; a bracket arranged to be secured to a vehicle frame; said bracket including two bowl-shaped bearings respectively enclosing said opposite ends of said stub shaft and thereby journalling said opposite ends of said stub shaft both axially and radially.

3. The anti-skid device of claim 2, wherein:
said bowl-shaped bearings are provided as shells threadedly received in corresponding openings provided in said bracket.

4. The anti-skid device of claim 3, wherein:
said bracket, between said corresponding openings is resilient, whereby said bowl-shaped bearings are pre-tensioned against said opposite ends of said stub shaft.

5. The anti-skid device of claim 2, wherein:
said ends of said stub shaft are made of stainless steel, and said bowl-shaped bearings are made of bronze.

6. The anti-skid device of claim 2, wherein:
each end of said stub axle, in a region centered on the longitudinal axis of the stub axle, is provided with an axially outwardly opening recess for receiving grease.

7. The anti-skid device of claim 1, wherein:
said ball joint ball is mounted to said outer end of said swing arm by an expansion bolt which pierces the ball and is tightenable for expanding and thereby tightening the ball relative to said socket.

* * * * *